Dec. 30, 1924.

N. A. CARTER 1,520,854

BOLL WEEVIL SPRAYING MACHINE

Filed Aug. 4, 1923     3 Sheets-Sheet 1

WITNESSES

Inventor
NATHAN A. CARTER

By
Attorney

Dec. 30, 1924.

N. A. CARTER 1,520,854

BOLL WEEVIL SPRAYING MACHINE

Filed Aug. 4, 1923     3 Sheets-Sheet 2

WITNESSES

Inventor
NATHAN A. CARTER

By
Attorney

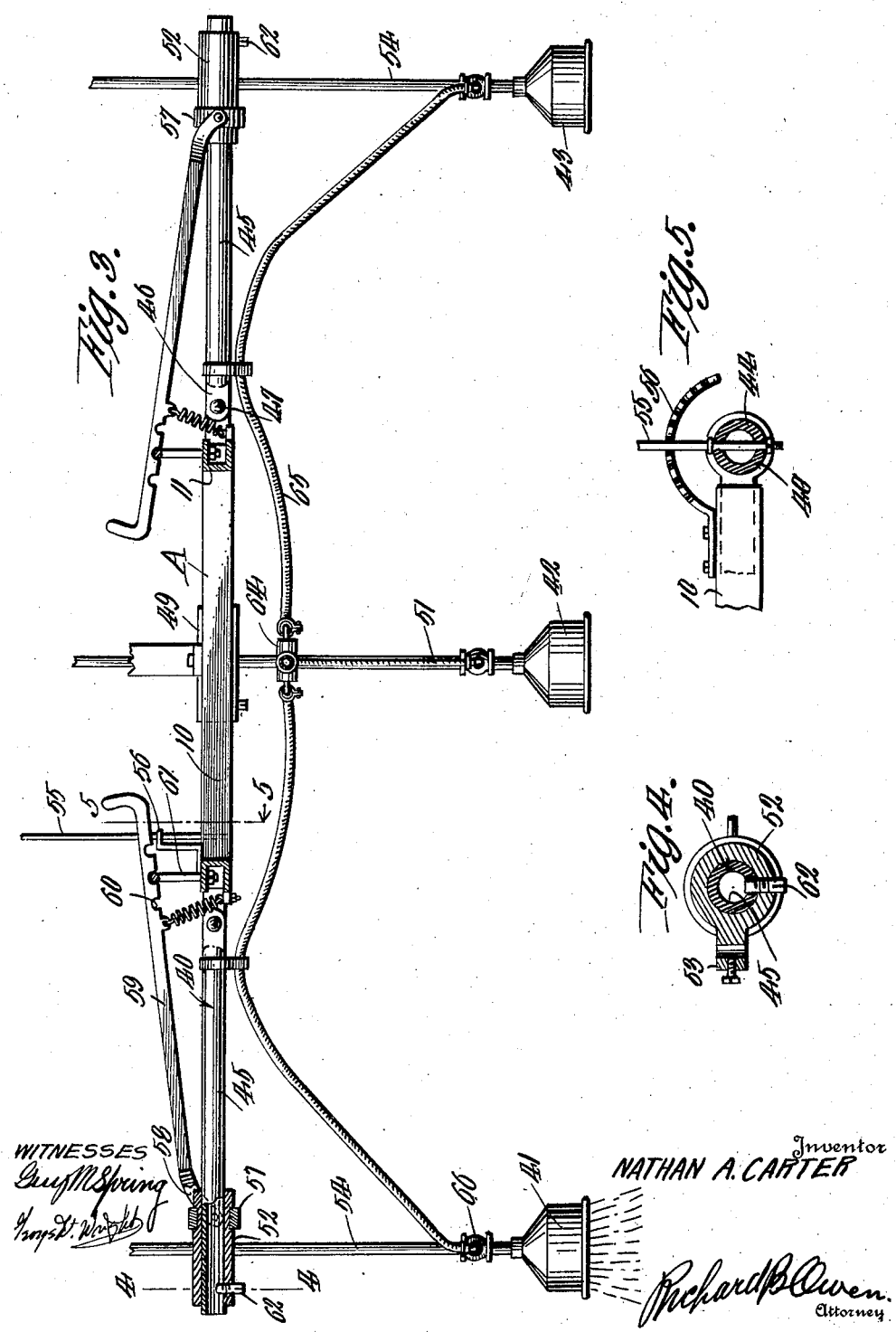

Patented Dec. 30, 1924.

1,520,854

UNITED STATES PATENT OFFICE.

NATHAN A. CARTER, OF EARL, ARKANSAS.

BOLL-WEEVIL-SPRAYING MACHINE.

Application filed August 4, 1923. Serial No. 655,634.

*To all whom it may concern:*

Be it known that I, NATHAN A. CARTER, a citizen of the United States, residing at Earl, in the county of Crittenden and State of Arkansas, have invented certain new and useful Improvements in a Boll-Weevil-Spraying Machine, of which the following is a specification.

This invention appertains to a novel machine for spraying growing plants and more particularly to a novel machine for treating cotton plants against boll weevils.

The primary object of the invention is to provide an improved boll weevil spraying machine embodying a wheeled frame, a tank for containing the spraying fluid, and novel means for directing the spraying fluid against a plurality of cotton rows simultaneously.

Another prime object of the invention is to provide an improved boll weevil spraying machine embodying a plurality of sprayer heads for spraying the fluid on the cotton plant and novel means for forcing the spraying liquid under pressure from a suitable storage tank to the spraying heads.

A further prime object of the invention is to provide novel means for adjusting the angle of the sprayer heads to the vertical, and novel means for adjusting the distance between the sprayer heads.

A further object of the invention is the provision of novel means for mounting the sprayer heads upon the frame, and novel means for rocking said supporting means, whereby the angle of all the spraying heads in relation to the vertical can be adjusted simultaneously.

A further prime object of the invention is to provide an improved boll weevil spraying machine comprising a wheeled frame, a storage tank for receiving the spraying liquid, means for agitating the liquid in the tank to prevent the settling of the solid parts thereof to the lower portion of the tank, an air compressor for supplying air to the tank for forcing the spraying liquid therefrom, spraying heads for receiving the liquid from the tank and novel means for operating the agitating means and the compressor from the ground wheels.

A still further object of the invention is to provide an improved boll weevil spraying machine of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawings, in which drawings, Figure 1 is a side elevation of the improved spraying machine.

Figure 3 is a transverse section through the machine taken on the line 3—3 of Figure 2.

Figure 4 is a detail transverse section taken on the line 4—4 of Figure 3 illustrating the means of connecting the end sprayers with the supporting means for the sprayers.

Figure 5 is a detail section taken on the line 5—5 of Figure 3 illustrating the means employed for changing the angle of the sprayers in relation to the vertical, and Figure 6 is a longitudinal section through the tank for the spraying liquid illustrating the agitator therein.

Figure 1:
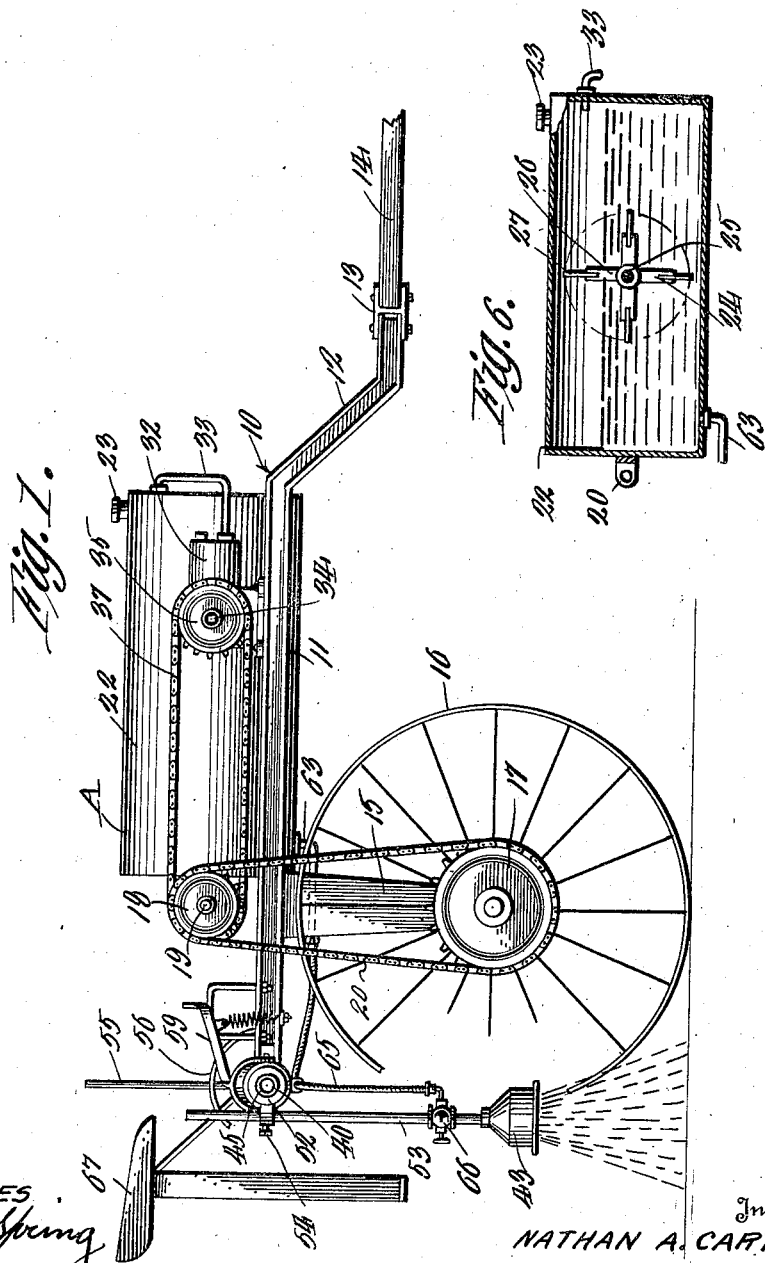
Figure 2:
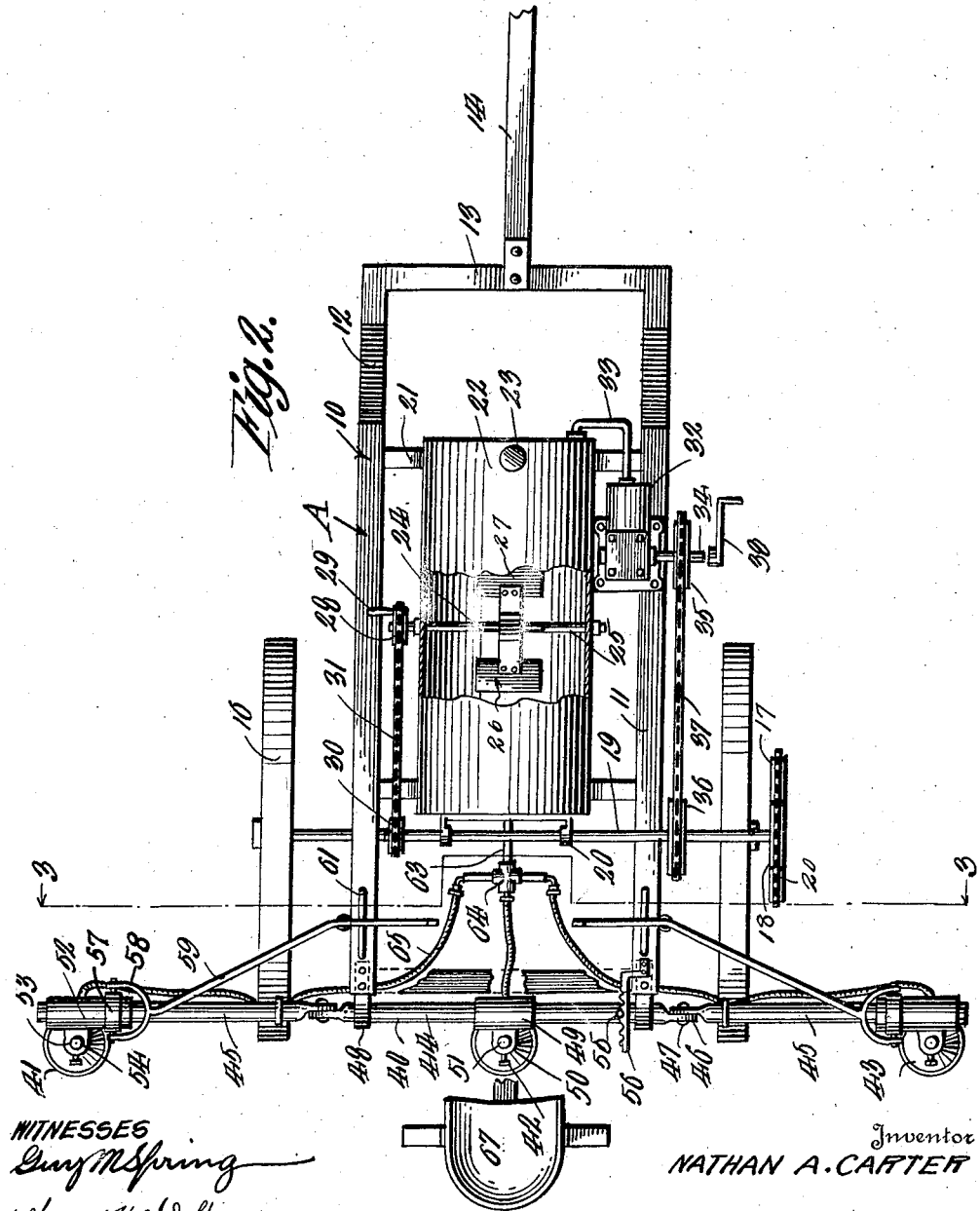
Figure 2 is a top plan view of the same.

Referring to the drawings in detail, wherein similar reference characters designate corresponding parts throughout the several views, the letter A generally indicates the improved spraying machine, which comprises a frame 10. This frame 10 can be built up in any desired way, but it is preferred to construct the same of side channel beams 11 connected together and braced in any desired way. The forward ends of the side channel beams 11 are inclined downwardly as at 12 and are connected by a cross brace 13, which can support any preferred type of draft appliance 14. The frame 10 at a point intermediate its ends supports the depending inverted U-shaped axle support 15, which rotatably carries the relative large ground engaging wheels 16. This permits the machine to straddle a row of cotton plants. One of the ground engaging wheels 16 has secured thereto a drive sprocket wheel 17, which is in direct alignment with a drive sprocket wheel 18 keyed or otherwise secured to a drive shaft 19 arranged transversely of the frame. This drive shaft 19 can be mounted in suitable bearing brackets 20, which can be secured to any preferred part of the machine. The purpose of the drive shaft 19 will be hereinafter more fully described, but it can be seen that this shaft will be rotated during movement of the machine over a field, due to the drive sprocket chain 20 trained around the sprocket wheels. The frame 10 supports a suitable bed 21 for the spraying liquid storage tank 22, which can be of any preferred character or size and this tank is provided with a filling neck and plug 23 to permit the ready introduction of the liquid into the same. In order to prevent the settling of the solid portions of the liquid to the bottom portion of the tank, an agitator 24 is provided, which consists of a rotatable transverse shaft 25 mounted in suitable bearings carried by the tank and this shaft has keyed or otherwise secured thereto an agitating wheel including a plurality of radiating blades 27. One end of the shaft 25 has connected thereto by a suitable clutch or the like a sprocket wheel 28, which can be rotated by a hand grip 29 if so desired. This permits the initial stirring up of the liquid before the machine is set in operation. In order to permit the agitator to be driven from the shaft 19 during the travel of the machine over a field, a sprocket wheel 30 is keyed to the shaft 19 in direct alignment with the sprocket wheel 28 and a connecting sprocket chain 31 is trained about the sprocket wheels 28 and 30.

In order to force the liquid from the tank an air compressor 32 of conventional construction is secured to the frame 10 and the outlet of the air compressor is connected by a pipe 33 with the tank 22. It is obvious that as the air enters the tank, that the same will tend to force the liquid therefrom. The pump 32 is provided with a drive shaft 34 which has connected thereto by a suitable clutch or the like a drive sprocket wheel 35. This drive sprocket wheel 35 is in direct alignment with the sprocket wheel 36 keyed or otherwise secured to the drive shaft 19 and a sprocket chain 37 is trained about the wheels 35 and 36 to permit the operating of the compressor from the shaft 19. This compressor can be operated by a suitable hand crank 38 in order to permit an initial charge of air to be forced into the tank before the starting of the operation of the machine.

At the rear end of the machine is disposed a support 40 for the spraying heads 41, 42 and 43. As shown there are three spraying heads and the head 42 is arranged directly between the end or side heads 41 and 43.

The support 40 is preferably formed from pipe or the like and includes an intermediate section 44 and end sections 45. The meeting terminals of the intermediate section 44 and the end section 45 are flattened to provide pivot ears 46 which are connected together by suitable pivot pins or the like 47. The central portion 44 of the support 40 is mounted for rocking movement in suitable bearing brackets 48 carried by the rear end of the frame 10 and these brackets can be riveted or otherwise secured to the frame. The intermediate section 44 has secured thereto a supporting sleeve 49 carrying a rearwardly extending supporting eye 50, which slidably receives a supporting rod or tube 51, which supports the central sprayer head 42. The end sections 45 have arranged thereon for sliding movement supporting sleeves 52 and these sleeves in turn support rearwardly extending eyes 53 for the reception of supporting rods or tubes 54, which carry the side spraying heads 41 and 43. The sleeves 52 are mounted upon the sections 45 for rocking movement therewith. The support 40 is adapted to be rocked by means of a lever 55 which extends entirely through the central section 44 and is secured thereto in any preferred way. The upper end of the lever can be provided with any preferred type of hand grip, and the lever is adapted to be sprung into any one of a plurality of notches formed in an arcuate segmental rack bar 56 carried by the frame of the machine. It is obvious that by moving the lever 55 that the entire support 40 can be rocked, thereby changing the angle of inclination of the heads 41, 42, and 43, so that the same can be moved toward the direction of travel, if so desired. The sleeves 52 have rotatably mounted thereon suitable collars 57 which in turn pivotally support the yoke-end 58 of the manipulating levers 59. These levers 59 are employed for swinging the sections 45 on the intermediate section 44. The levers 59 are provided with a plurality of spaced notches 60 in their lower surface and any one of these notches is adapted to receive a supporting bracket 61 bolted or otherwise secured to the frame 10.

Thus it can be seen that these end or side frame heads 41 and 43 can be effectively raised and lowered. If desired the sleeves 52 can also be slid on the side sections 45 in order to regulate the distance between the side nozzles or spraying heads 41 and 43 and the central spraying head 42 and the sleeves 52 are held in an adjusted position on these sections 45 by means of suitable thumb screws 62.

A suitable discharge pipe 63 is connected with the rear end of the tank 22 and has a coupling 64 secured to its rear end. Flexible hoses 65 are utilized for connecting the coupling with the sprayer heads 41, 42 and 43. Any preferred type of valve 66 can be employed for controlling the flow of the fluid to each head.

From the foregoing it can be seen that I have provided an exceptionally simple and durable spraying machine, in which the spraying heads can be adjusted in relation to one another to the size of the rows of cotton, raised or lowered in a horizontal plane, or swung to the desired angle to the vertical.

Changes in details may be made without departing from the spirit or the scope of this invention.

What I claim as new is:

1. A machine of the class described including a wheel carried frame, a spray head support having an intermediate section rotatably mounted on the frame, and end sections pivotally connected to opposite ends of the intermediate section and extending outwardly therefrom, spray heads mounted on said sections, cooperating means carried by the intermediate section and the frame manually operable for rotating said support relative to the frame, to change the angular relation of the spray head, bracket members mounted on opposite sides of the frame, and levers carried by said end sections having a plurality of notches adapted for cooperation with the bracket members, said levers being operable to move the end sections on their pivots with the intermediate sections and the bracket members, when in cooperation with the notches, being adapted to retain said end sections in an adjusted position.

2. A machine of the class described including a wheel carried frame, a spray head support having an intermediate section rotatably mounted on the frame, and end sections pivotally connected to opposite ends of the intermediate section and extending outwardly therefrom, spray heads mounted on said sections, cooperating means carried by the intermediate section and the frame manually operable for rotating said support relative to the frame, to change the angular relation of the spray head, bracket members mounted on opposite sides of the frame, levers carried by said end sections having a plurality of notches adapted for cooperation with the bracket members, said levers being operable to move the end sections on their pivots with the intermediate sections and the bracket members, when in cooperation with the notches, being adapted to retain said end sections in an adjusted position, and resilient means for normally holding said levers in engagement with said bracket members.

3. A machine of the class described including a wheel carried frame, a spray head support having an intermediate section rotatably mounted on the frame, and end sections pivotally connected to opposite ends of the intermediate sections and extending outwardly therefrom, spray heads mounted on said sections, cooperating means carried by the intermediate section and the frame manually operable for rotating and holding said support in a desired position of adjustment for changing the angular relation of said spray head, bracket members mounted on the sides of said frame, levers having a relatively rotatable connection with said end sections and formed with a plurality of notches for cooperation with said bracket members, and resilient means for retaining said levers normally in engagement with said bracket members, whereby said levers may be operated for moving said end sections on the pivots with the intermediate sections and the bracket members seating in said notches will hold said end sections in a desired position of adjustment.

In testimony whereof I affix my signature in presence of two witnesses.

NATHAN A. CARTER.

Witnesses:
J. C. JOHNSON,
H. W. MAXEY.